United States Patent [19]

Fuller

[11] 4,406,865

[45] Sep. 27, 1983

[54] METAL EXTRACTION BY SOLID-LIQUID AGGLOMERATES

[75] Inventor: Everett J. Fuller, Gillette, N.J.

[73] Assignee: Exxon Research and Engineering Co., Florham Park, N.J.

[21] Appl. No.: 199,025

[22] Filed: Oct. 20, 1980

Related U.S. Application Data

[63] Continuation-in-part of Ser. No. 969,813, Dec. 15, 1978, abandoned.

[30] Foreign Application Priority Data

Dec. 12, 1979 [GB] United Kingdom ............... 7942806
Dec. 13, 1979 [DE] Fed. Rep. of Germany ....... 2950567

[51] Int. Cl.³ .......................................... B01D 11/04
[52] U.S. Cl. ................................. 423/10; 75/101 BE; 210/634; 210/638; 252/314; 423/6; 423/24; 423/25; 423/54; 423/99; 423/100; 423/DIG. 14
[58] Field of Search .................. 423/6, 7, 24, 10, 25, 423/DIG. 14, 54, 99, 100; 75/101 BE; 252/314, 323-325; 210/643, 638, 234

[56] References Cited

U.S. PATENT DOCUMENTS

| | | |
|---|---|---|
| 3,102,782 | 9/1963 | Small . |
| 3,320,033 | 5/1967 | Goren et al. . |
| 3,779,907 | 12/1973 | Li et al. . |
| 3,950,487 | 4/1976 | Pemsler et al. . |
| 4,051,230 | 9/1977 | Miyauchi . |
| 4,119,580 | 10/1978 | Smith et al. . |
| 4,151,076 | 4/1979 | Reinhardt et al. ......... 423/DIG. 14 |
| 4,268,395 | 5/1981 | Stewart .............................. 210/634 |

FOREIGN PATENT DOCUMENTS

| | | |
|---|---|---|
| 918934 | 1/1973 | Canada . |
| 810090 | 3/1959 | United Kingdom . |
| 900113 | 7/1962 | United Kingdom . |
| 906020 | 9/1962 | United Kingdom . |
| 916656 | 1/1963 | United Kingdom . |
| 1462599 | 1/1977 | United Kingdom . |
| 1392023 | 4/1975 | United Kingdom . |
| 1501459 | 2/1978 | United Kingdom . |

OTHER PUBLICATIONS

Fuller, "Separations by Slurry Extraction", Chem. Abs., vol. 78 #161311c (1973).
Sutherland, "The Agglomeration of Aqueous Suspensions of Graphite" Can. J. Chem. Eng. Dec. 1962, pp. 268-272.
Farnand et al., "Spherical Agglomeration of Solids in Liquid Suspension", Can. J. Chem. Eng., Apr. 1961, pp. 94-97.
Rice, "Recent Developments and Potential Uses for Carboxylic Acid Extractants", Hydrometallurgy 39 (1978), 111-133.
Sparks, "Beneficiation of a Phosphoriferous Iron Ore . . . ", Int'l J. Mining Proc., (1974), 231-241.
Capes, "Rejection of Trace Metals from Coal . . . ", Env. Sci. & Tech. 8(1) (Jan. 1974), 35-38.
Capes, "Basic Research in Particle Technology . . . ", Can. J. Chem. Engr. 54 (Apr. 1976), 3-12.
Meadus, "The Upgrading of Tin Ore by Continuous Agglomeration" Can. Mining & Mett. Bull., 59 (1966) 968-970.
Farnard, "The Application of Spherical Agglomeration . . . ", Can. Mett. Quary. 3(2) (Jun. 1964), p. 123-135.
Sirianni, "Recent Experience with The Spherical Agglomeration Process, Can. J. Chem. Engr., 47 (1969), 166-170.
Capes, "Formation of Spheres from Finely Divided Solids . . . ", I & EC Proc. Dej. & Dev. 6 (1967), 146-154.

Primary Examiner—Deborah L. Kyle
Attorney, Agent, or Firm—Robert J. North

[57] ABSTRACT

A modified liquid-liquid extraction system is disclosed in which a particulate solid and a liquid, both insoluble in a second liquid, are mixed to form agglomerate particles which efficiently extract metal ions from dilute solutions. The extraction is rapid and requires a much lower volume of extracting phase for good contacting than conventional liquid-liquid extraction. Mixing energy is low, clean-up of effluent water is easily accomplished and metal values are readily stripped from the agglomerates by well-known techniques, such as treatment by aqueous acid solution.

18 Claims, 1 Drawing Figure

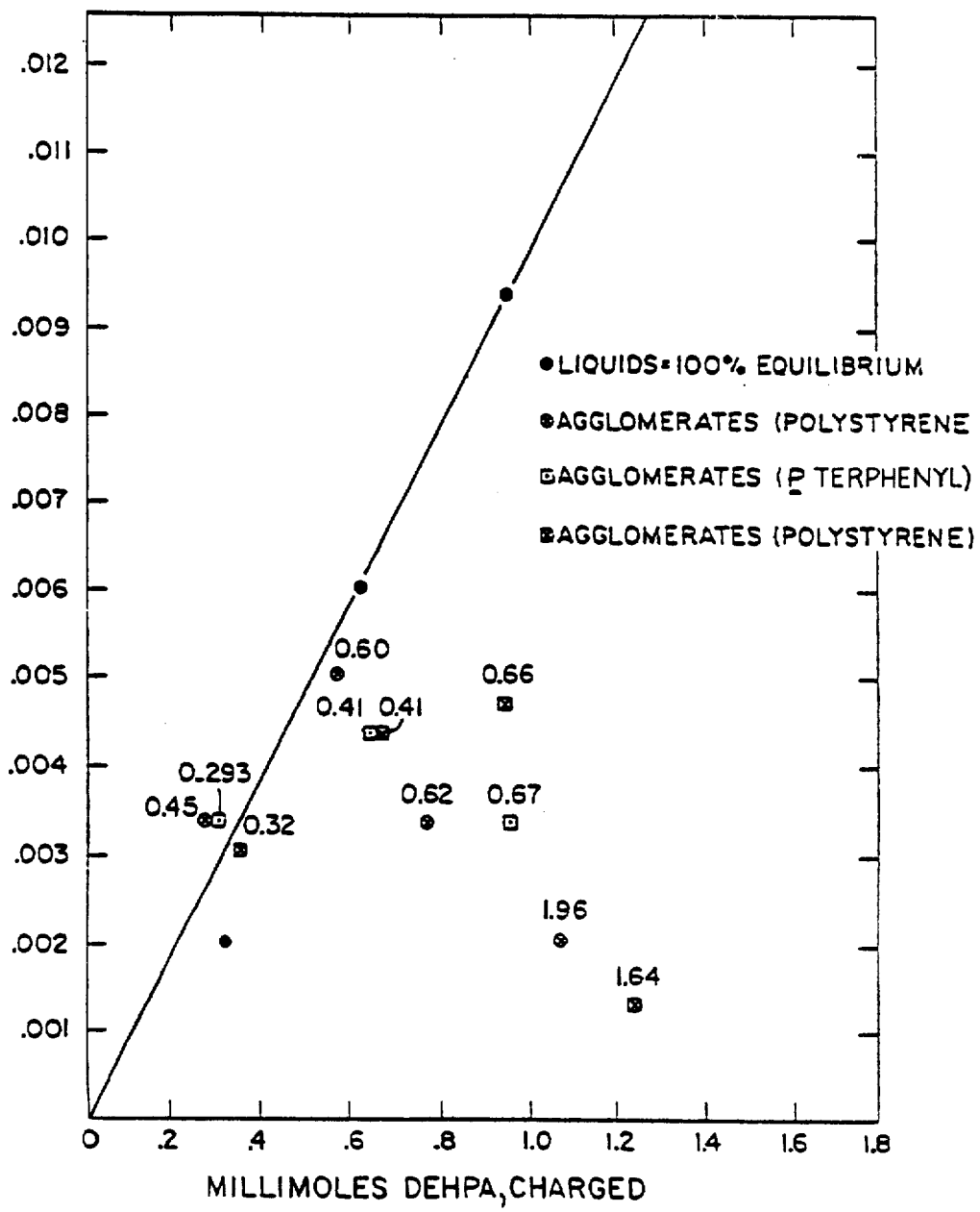

METAL EXTRACTION BY SOLID-LIQUID AGGLOMERATES

CROSS REFERENCE TO RELATED APPLICATION

This application is a continuation in part of Ser. No. 969,813, filed Dec. 15, 1978, now abandoned.

BACKGROUND OF THE INVENTION

1. Field of the Invention

The invention relates to the extraction of metal ions from dilute aqueous solutions and, more particularly, to a modified liquid-liquid extraction of such metal ions.

2. Description of the Prior Art

Extraction of metal ions from dilute aqueous solutions is important in recovery of uranium, copper and many other metal values for commercial use. It is also important in purification of water, for example, from mercury ion. Extraction is often done by liquid-liquid phase distribution using a dilute solution of a complexer in a water-insoluble oil or by contacting the feedstream with a solid ion-exchange resin. A problem with solid resins is that they are easily fractured into fines which then tend to plug the extraction system. Further, the presence of solids such as mud, grit and other debris implies a filtration step, since otherwise the solids will plug the resin bed. Liquid extraction is much faster than solid resin use, but requires large volumes of oil phase, especially for dilute metal ion solutions. Also, as with solid ion exchange, the presence of any solids usually requires filtration prior to extraction.

A number of approaches have been proposed to circumvent these problems. For example, in U.S. Pat. No. 3,102,782, a process is disclosed for the recovery of heavy metal values (uranium) from aqueous solutions by solvent extraction with novel gel-like water-insoluble solvent-containing resin compositions.

German Offenlegeschrift No. 2,732,800, (English equivalent as Israeli patent application No. 050,120 [1976]) discloses impregnated with a selective extraction agent dissolved in solvent readily absorbed by the polymer.

U.S. Pat. No. 3,320,033 discloses an extractant for metal values dissolved in aqueous media comprising a solid substance having an inert hydrophobic surface on which an inert hydrophobic surface on which an organic solvent extractant is absorbed. Essentially, the patent discloses liquid-liquid extraction in which a water-insoluble organic liquid is supported as a coating on the solid substance. An advantage of this approach is that solutions containing solids may be treated without filtration; however, the extracting ability of the system is limited to the amount of organic liquid which is absorbed on the solid substance. As disclosed in the patent, the maximum amount of organic liquid that can be absorbed in one or two monolayers (about 15 to 30 Angstroms in thickness).

A problem with the approach presented by the foregoing disclosures is that the particle size of the resins is often fixed. Further, long equilibration times are encountered, probably as a consequence of low interfacial area between liquid adsorbed on the surface of the particles and the feedstream.

A need remains in the field of hydrometallurgical extraction and dilute metals extraction for a system capable of rapid extraction of metal values and capable of tolerating solids in the feedstream.

SUMMARY OF THE INVENTION

In accordance with the invention, there is provided a process for extracting at least one dissolved metal value from a liquid phase which comprises:

(a) contacting said liquid phase with solid-liquid agglomerates, comprising a finely divided solid, of average particle size of up to about 100 microns, dispersed, in a binding liquid for the solid, said binding liquid and said solid being substantially insoluble in said liquid phase, wherein either solid, liquid or both, being capable of chemically interacting with said at least one metal value, thereby removing same from said liquid phase and wherein said agglomerates are substantially larger in average particle size than said finely divided solid, for a time sufficient to load said agglomerates with said at least one metal value;

(b) separating said loaded agglomerates from said liquid phase;

(c) stripping said at least one metal value from said loaded agglomerates.

Specifically described are processes for extracting uranium, chromium, zinc and copper values from aqueous solutions, which can be acidic, basic or neutral.

Solid-liquid agglomerates operable in the invention process are preferably formed by (1) combining finely divided solid particles with a binding liquid in the presence of a suspending liquid to form a paste, the suspending liquid and binding liquid being substantially immiscible in each other and the solid particles being substantially insoluble in the suspending liquid and (2) shearing the mixture at a substantially uniform, moderate rate for a time sufficient to generate solid agglomerates of a substantially uniform size. The solid-liquid agglomerates are contacted with a feedstock containing at least one metal value which is to be separated from the feedstock. The feedstock and agglomerates are equilibrated to load the agglomerates and then separated. The loaded agglomerates are then stripped of the metal value or values, and recycled to contact fresh feedstock.

The agglomerates formed may be recycled through the contacting and stripping operations virtually idefinitely without substantial loss of size. Solids in the feedstock need not be pre-filtered unless other considerations dictate. The extraction is rapid and requires a much lower volume of extracting phase for good contacting and liquid-liquid extraction, as compared with conventional liquid-liquid extraction. Mixing energy is low and cleanup of effluent water is easily accomplished. Further, equilibration is much faster than that afforded by prior art processes, with liquid being distributed throughout the agglomerate, rather than merely on the surface.

BRIEF DESCRIPTION OF THE DRAWING

The FIGURE, on coordinates of millimoles of uranium extracted as a function of millimoles of extracting agent, is a plot defining equilibrium capacity of the extracting agent for uranyl ions taken from the data described in Example 1.

DETAILED DESCRIPTION OF THE INVENTION

In conventional liquid-liquid extraction, the extraction of a species such as a dissolved metal value from one liquid into a second involves the generation of interface by mixing to disperse the phase or by the use of packing. Good dispersion is necessary since the liquid are mutually insoluble and the extraction rates tend to be limited by mass transfer across the interface. However, if the droplets are too small as a result of excessive dispersion, they tend to remain dispersed as a haze, which greatly complicates the extraction process. Removal of hazes of extracting liquid from the depleted feedstream often implies large settling devices, coalescence aids and commonly a large holdup of extracting liquid phase. Dispersion and coalescence of liquid droplets lead to the generation of fine droplets. The term "liquid phase" as used herein deontes any liquid phase containing dissolved metal ions, and preferably includes aqueous phases which can be acidic, basic or neutral.

By the process of the invention, the liquids which are contacted are not subjected to dispersion and coalescence in the mass transfer, or extraction, step. Rather, one liquid is formed into agglomerates with small solid particles in a preliminary operation. This operation combines solid with binding liquid in the presence of a suspending liquid which may in effect be part of the feedstream. In the agglomerated state, the binding liquid is evidently dispersed with respect to the feedstream which it contacts during the extraction operation. Thus, no making and breakup of droplets ordinarily associated with dispersion and coalescence are encountered, and a primary source of liquid entrainment is obviated.

Also, the problems associated with solid particles in a feedstream are dealt with effectively by the process of the invention. As mentioned, adequate dispersion of liquid implies some generation of very fine droplets. Because of their small size and high surface area, their interaction with solid particulates in the feed is maximized. This in turn leads to collection of solids and uncoalesced droplets at the liquid-liquid interface in settling zones (scum). Any formation of fine droplets due to dispersion of binder liquid in suspending liquid is limited to the agglomeration step by the inventive process, which implies a drastic reduction of the interaction of solids in the feed with small droplets of liquid, and, hence, a reduction in the formation of scum.

1. Formation of Agglomerates

There is considerable prior art on the formation and description of agglomerates, see, e.g., Canadian Metallurgical Quarterly, Vol. 3, No. 2, April-June, 1964, page 124, Canadian Journal of Chemical Engineering, Vol. 39, pp. 94-97 (1961) and Canadian Journal of Chemical Engineering, Vol. 40 pp. 268-272 (1962), which are hereby incorporated by reference for this purpose. As is well-known, agglomerates, which are collections of small particles of solid-liquid suspension, are formed by combining three phases: a suspending liquid, a binding liquid and solid particles. The suspending liquid and binding liquid are substantially immiscible in each other and may be water/oil or oil/water. The solid particles are comprised of materials which are substantially insoluble in the suspending liquid, in order to avoid loss of an appreciable portion of the agglomerating species.

Best results are obtained by employing finely divided solid particles below about 100 microns in average particle size, preferably 5-50 microns, and particularly preferred about 5-10 microns, that can be partially soluble in the binding liquid, and preferably at least about 5 wt.%. Of course, the solid phase should not have an excessively high solubility, in order to avoid substantial dissolution in the binding liquid. The solid phase is dissolved in the binding liquid until a saturated solution occurs. By employing a solid present in a saturated solution after the system is equilibrated, agglomeration occurs readily.

Either the solid or the binding liquid may act as the extractant and by this term is meant that chemical interaction of the material with metal value via hydrogen substitution, chelation, or complex formation. Suitable extracting solids for forming agglomerates should preferably be water-insoluble and oil-insoluble and include solid carboxylic acids (n-$C_{16}$-$C_{18}$ paraffinic acids) and powdered ion-exchange solids. Representative examples are stearic acid, palmitic acid, quaternary ammonium ion exchange resins, and the like. Suitable inert binding liquids include liquid hydrocarbons such as low odor paraffinic solvent (LOPS), heavy kerosene, halogenated hydrocarbons and high boiling silicone liquids chosen for their wetting ability. Representative examples are chloroform, carbon tetrachloride, higher halogenated paraffins, and the like.

Where the binding liquid is the extractant, suitable binding liquids include liquid carboxylic acids such as oleic acid, halogenated carboxylic acids such as α-bromolauric acid and conventional liquid ion exchange agents which form oil-soluble complexes with metal ions. Representative examples include di-(2-ethylhexyl) phosphoric acid, (4-hydroxy-3-aldoxime-4'-methyl) diphenylmethane, tri-(n-octyl) phosphine oxide, tri-(n-octyl)N-methyl ammonium chloride, and the like. In contrast to liquid-liquid extraction using liquid ion exchange agents, however, dilution of the agents is not necessary for use in the process of the invention. Suitable inert solids for forming agglomerates include solid high molecular weight organic polymers and high molecular weight ($C_{10}$ and higher) hydrocarbons. Representative examples include polystyrene, polypropylene, polyethylene, naphthalene, p-terphenyl and the like.

Examples of solids, binding liquids and the solubilities of solid in binding liquid suitable for use in the practice of the invention include stearic acid in chloroform (20 wt.%) and p-terphenyl in kerosene (about 10 wt.%).

In certain cases, the binding liquid can react with the metal values to form the solid, which then, in the presence of excess binding liquids, forms agglomerates. An example is the reaction of oleic acid (binding liquid) with $CU^{++}$ (metal value) to form copper oleate (solid precipitate).

The proportions by weight of the three phase may vary, in the agglomerate preparation, subject to considerations discussed below. A convenient ratio employed is 30/3/1 of suspending liquid/solid/binding liquid. For treating aqueous feedstocks, the suspending liquid of choice is usually water, and the solid/binding liquid combination will be chosen for extraction properties and insolubility in the feedstock. This will ordinarily rule out solids of appreciable solubility in water such as benzoic acid (about 0.3 wt.%). Generally the weight ratio of the solid/binding liquid in the agglomerate is about 3:1 to 10:1, although higher and lower ratios are also operable.

The agglomerates are prepared using a shearing action on the three-phase system to generate a controlled agglomerate size. The finely divided solid particles are bound together with the binding liquid to form agglomerates of substantially larger size then the finely divided particles and by the term "substantially larger" is meant that in the opinion of the inventor, it is reasonably believed that the agglomerates exist in about a factor of about ten times larger than the component finely divided solid on the average and higher. A preferred agglomerate size is about 100 to 500 microns for most extractions of metal ions from aqueous acidic solutions. It is preferable to start with finely divided solid particles about 5 to 50 microns in size and particularly 5–10 microns in size, although larger sizes up to about 100 microns may be employed. It should be noted that such small sizes are ordinarily inoperable in conventional solid-liquid contacting extraction, as is well-known. Sizes larger than 100 microns on the average tend to form agglomerates with poor extraction ability and much higher particle sizes result in no agglomerates but merely indicate coated particles. Employing the procedures described herein, agglomerates of about 0.1 to 0.5 mm in size are readily formed in a short period of time. Agglomerates of at least about 0.1 mm are desired in order to avoid non-settling suspensions. Of course, the larger the agglomerates, the lower the surface area and, hence, the slower the extraction of metal values or other species. Accordingly, above 500 microns, economics dictate the maximum size. However, if too large a size is inadvertently obtained, the size may be conveniently reduced by altering the rate of shearing. Shearing the three-phase system is an important aspect in the production of the agglomerates. Too high a shearing rate reduces the size of the agglomerates, while insufficient shearing rate results in the production of unacceptably large agglomerates. Further, non-uniform shear, such as that produced by stirring with a blade or by a blender, generates non-uniform agglomerate size, and is thus undesirable. Accordingly, a substantially uniform shear, as by shaking or tumbling, rapidly generates spherical agglomerates of the desired size. For example, shaking a mixture of 75 parts of water (suspending liquid), 3 parts of carbon tetrachloride (binding liquid) and 10 parts of stearic acid (solid particles having an initial size than less 10 $\mu$m) at a rate of four times a second over a distance of eight inches for two minutes, results in an average agglomerate size of about 1 mm diameter.

The final dimension of the agglomerates is inversely proportional to the shear rate, directly proportional to the ratio of the amount of binder to solid, directly proportional to the temperature used and directly proportional to the ratio of the viscosity of the suspending liquid to the viscosity of the binder liquid. Accordingly, the optimum shearing rate and time of shearing required to achieve a particular agglomerate size must be determined for each particular three-phase system. However, this determination is not inordinate, since, as mentioned above, agglomerate size can be decreased or increased by respectively increasing or decreasing the shear rate. As a consequence of the foregoing dependence of agglomerate size on the factors listed, it is clear that for example, in a system using a particular binding liquid to solid ratio generating 0.3 mm size agglomerates in two minutes, if one desired to increase the binding liquid to solid ratio and still retain the same size, one would have to increase the shear rate.

Agglomerates may be formed at any temperature below the boiling point of the liquids. Typically, in refinery operations, ambient liquids are at about 40° C. Of course, heat can be applied to speed up the reaction, but viscosity of binding and suspending liquids will generally decrease, while solubility of solid in binding liquid will increase. The net effects on agglomerate size and operational efficiency can be readily checked by the principles herein described.

The agglomerates may be removed, if desired, from the suspending liquid by any conventional mechanical method. If the agglomerates are to be directly used in removing a particular metal value from a feedstock, it may be convenient to employ the feedstock itself as the suspending liquid.

2. Treatment of Feedstream

Feedstream and agglomerates are introduced into a contactor such as a shaker vessel, a stirred baffle vessel or the like. The feedstream may contain metal values such as uranium, copper, mercury and the like, present in dilute solution or as an impurity. While the process of the invention may be employed in treating concentrated solutions, it is most efficacious in treating dilute solutions.

Following equilibration, which surprisingly occurs in a matter of minutes, the feedstream and agglomerates are separated. The agglomerates, now loaded with the extracted metal values, are sent to a stripper which removes the loaded metal values. Metal values may be stripped, for example, by concentrated aqueous solutions of appropriate mineral acids. The stripped agglomerates are then returned to the contactor.

The agglomerates of the invention are stable to handling and cycling through loading and stripping operations, as well as drying and mechanical sieving. Thus, the agglomerates may be cycled through the contacting and stripping operations virtually indefinitely without substantial loss of size or reduction of binding liquid. Over the course of several cycles, some of the binding liquid may be leached out. Additional binding liquid may be added as necessary to replenish leached binding liquid. If the agglomerate size is reduced after several cycles, a lower shear rate may be employed to reconstitute the agglomerates to the desired size. Any shattered fines will also be picked up and added to the agglomerates by this procedure.

The foregoing process readily lends itself to multistage extraction of dilute metal values in which a feedstream containing a dilute metal value is cycled through several stages, resulting in depleted feedstream at the last stage and in which fresh (or regenerated) agglomerates are introduced at the last stage and are continuously cycled forward to the first stage where the loaded agglomerates are removed and sent to a stripping stage, which may also be a multistage operation. In the stripping stage, the metal values are removed by dissolution in, for example, an acid to regenerate the agglomerates. Stripped metal values, now dissolved in acid media, for example, may be readily removed from solution as in conventional metals extraction processes, such as electrowinning and the like.

The presence of solids in the feedstream has been found not to affect the extraction process. However, if a fixed bed reactor, similar to that employed in solid resin exchange, is contemplated, then it may be desirable to prefilter the feed, as in conventional resin exchange process technology, to avoid plugging the bed. In any event, the use of fluidized beds or other moving solids operations in agglomerate extractions is particularly advantageous as compared with similar operations with solid resin particles, since, as discussed earlier, agglomerate particles are formed and used under conditions leading to the incorporation of fines.

The feed to agglomerate ratio may be high. Thus, the process of the invention is especially useful in extracting dilute metal values or dissolved impurities from solution, with ratios of 100:1 being easily accomplished. This is in contrast to liquid-liquid extractions, which is generally operated at a ratio of about 1:1 and maximally at ratios of about 10:1 or 20:1.

The agglomerates may be operated in acidic or basic or neutral systems, as in the usual extraction procedures. Indeed, mixed agglomerates may be employed, mixing a cation exchanger and an anion exchanger, each incorporating a separate assembly of agglomerates which contact the same feedstream simultaneously. For example, zinc and chromium ions may be removed substantially simultaneously from a feedstream containing these ions in solution, employing di-(2-ethyl)hexyl phosphoric acid (DEHPA) and Aliquat 365 (a tradename of General Mills, Inc., Kankakee, Illinois), which is composed primarily of tri-(n-octyl)N-methylammonium chloride. The former reagent is an efficient organic-soluble extracting agent for zinc ions in aqueous solution; the latter reagent is an organic-soluble agent useful in extracting anionic species such as dichromate ions ($Cr_2O_7^{--}$), which are the usual form of hexavalent chromium ions in acidic aqueous solution. Conventional liquid-liquid extraction could not be employed in such a separation, since the agents react to form an organic-soluble salt which cannot extract either anions or cations. However, the foregoing process may be considered to be analogous to a process employing mixed bed ion exchange resins.

The process may be carried out at whatever ambient temperature below the boiling point of the liquids is employed. At noted above, heating the feedstream may be employed to speed up reaction, but the same considerations discussed earlier with regard to the effect of temperature on agglomerate formation apply.

Using agglomerates of size on the order of about 0.1 to 0.5 mm results in both fast and facile separation of agglomerates from the feedstream for stripping. The advantage of employing agglomerates in extraction is that the agglomerates are not shattered into fines but are defined by the solid-liquid ratio and shear. Plugging by fines is avoided, since any fines that are inadvertently generated are immediately picked up by the agglomerates. Further, the loading rates for agglomerates are at least as high as those for liquid-liquid systems, and ordinarily in excess of solid resin rates, with much less mixing intensity, lower volume rates or organic phase relative to aqueous feed and with elimination of large settling facilities or coalescence devices to counteract entrainment. Coalescence of liquid droplets is necessary for phase separation in liquid-liquid extraction, but is not required in agglomerate operations. As a result, the generation of extremely fine liquid droplets, which occurs as larger drops coalesce, is completely avoided by the process of this invention, with the elimination of hazes and major savings in apparatus for coalescence, settling and removal of entrained haze. Also, the agglomerates suitable for extraction processing are fabricated by simple mixing under controlled shear of the proper proportions of solid and binding liquid. A wide variety of solids, for example, long, straight chain carboxylic acids such as stearic acid, polystyrene, polyphenyls, polyesters, polyolefins and the like, may be used in forming agglomerates. Solid-liquid contacting operations with agglomerates provide the transfer and flow advantages of large particle size while maintaining the high equilibrium rates characteristic of small sized solid particles. For example, 0.5 mm diameter agglomerates of particles are quickly separated from a feedstream, such as by decantation or analogous procedures, yet the particles themselves, if on the order of 5 to 10 $\mu m$, be separated only with difficulty from the liquid in which they are suspended.

3. Applications

As is well-known, liquid-liquid contacting depends on mechanical mixing to generate high interfacial area and facilitate mass transfer between phases. As a consequence, however, emulsions or haze droplets (droplets too fine to settle out of the continuous phase) are generated, and entrainment of extracting solvent by the depleted feedstream can be substantial. Spherical agglomerations has previously been used to clarify liquid-liquid emulsions. Thus, incipient haze formation and entrainment of extracting solvent by the depleted feedstream are substantially avoided by the process of the invention. This is a consequence of the requirement for agglomerate existence that the binding liquid wet the solid better than the suspending liquid.

Further, good contacting without generation of emulsions or haze droplets usually requires an appreciable inventory of extracting solvent relative to the volume of liquid feed, so that enough interface can be easily generated. For this reason, liquid extraction as a technique to recover minor pollutants from water is seldom used. However, in the process of the invention, the extracting liquid is dispersed by agglomeration with a solid prior to contacting the feedstream. Thus, the inventory of the extracting liquid is controlled by agglomerate stability considerations, and is a small fraction of that required by conventional liquid-liquid contacting.

One application involves the considerable liquid ion-exchange technology based on recovery of metals, e.g., copper, from leach solutions. A reaction of interest is $$CU^{++} + 2RH \rightleftharpoons CuR_2 + 2H^+ \qquad (1)$$

Note that Equation (1) is applicable whether the mode of recovery is by way of a solid-ion-exchange resin in the acid, form, liquid ion-exchange moiety dissolved in in the acid form, liquid ion-exchange moiety dissolved in kerosene, or a solid agent agglomerated with a binding liquid into spheres. In the case of agglomerates, RH and $CuR_2$ may exist as undissolved (but agglomerated) solids. By comparison, the LIX (liquid ion-exchange) systems as ordinarily utilized require total dissolution, and the solid resins use no second liquid. As indicated by Equation (1), the pH of the feedstream is a strong variable.

Examples of suitable extracting solids for forming agglomerates for $Cu^{++}$ extraction include high molecular weight (i.e., water-insoluble) solids such as stearic and palmitic ($n-C_{16}-C_{18}$ paraffinic) acids. A suitable inert binding liquid is a halogenated hydrocarbon, such as chloroform.

Suitable extracting binding liquids include liquid ion exchange agents, combined with inert solid hydrocarbons such as p-terphenyl.

The extraction of $Cu^{++}$ may also be done by forming solid copper oleate from a combination of oleic acid and $Cu^{++}$; the agglomerates form in the presence of excess oleic acid, as described earlier.

The extent to which rates of metal pickup are changed by agglomeration depend on solubilities of $Cu^{++}$ and solid in binder liquid, particle size of solid, diffusion rates through the binder liquid, and agglomerate size.

The operational advantages of agglomeration depend on control of size by amount of binding liquid and shear imposed. Agglomerates of small size appear to be useful for loading with metal values, due to the larger surface area. Removal of depleted water is easier with larger agglomerates. A still different regime of agglomeration may be indicated for efficient acid stripping (the reverse of Equation (1)).

EXAMPLES

EXAMPLE 1—Uranium Extraction From Phosphoric Acid

A. Prior Art Process

Uranium was extracted from a solution of 5 M $H_3PO_4$, which is a strong complexing medium for the $UO_2^{++}$ ions, using DEHPA [di-(2-ethyl)hexylphosphoric acid] and TOPO (trioctylphosphineoxide), with TOPO used at one-fourth the molar concentration of DEHPA. Only a few percent of the DEHPA-TOPO charge was loaded with uranium, even under 100% equilibrium conditions; the mole ratio of $H_3PO_4$ to DEHPA ranged from 300 to 1300 and the volume ratio of acid to oil ranged from 45/1 to 55/1. The low loading is a consequence of competition with $H_3PO_4$, which complexes with $UO_2^{++}$. Enough heavy kerosene (LOPS, Low Odor Paraffinic Solvent) was then added to cause phase separation to recover $UO_2^{++}$- loaded DEHPA-TOPO solution.

B. Inventive Process

For comparison, agglomerates were formed using 5 to 10 μm particles of either solid polystyrene (PS) or p-terphenyl (PT) in DEHPA-TOPO solution (binding liquid) of the same DEHPA/TOPO ratio as above, but with no added kerosene. Agglomerate sizes of 0.294 mm in diameter were equilibrated with $UO_2^{++}$ in two minutes, shaking at four times a second, eight inch displacement at 25° C. The volume ratio for the 100% equilibrated agglomerates was 86/1 (aqueous/organic) at a mole ratio of $H_3PO_4$ to DEHPA of 1300. The agglomerates were found to phase separate much easier from the aqueous feed then a kerosene phase containing the same amount of uranium. The same capacity for uranium was shown by DEHPA whether or not it was agglomerated. As can be seen, however, less extractant was required than for the prior art process (86/1 vs. 55/1).

The FIGURE shows the results of tests done at 25° C. with DEHPA-TOPO to extract uranyl ion from 5 M $H_3PO_4$. The amount of uranium extracted is plotted against the amount of DEHPA charged. The straight line defines 100% equilibrium loading conditions. The agglomerate points, which represent the various agglomerate sizes noted (weight average particle diameter in mm, determined by sieving), show that agglomerates less than about 0.294 mm are equilibrated in two minutes shaking at 4/second, 8 inch displacement at 25° C. Thus, a given charge of DEHPA implies equilibrium uranyl loading only if the contacting is adequate. Non-equilibrated tests indicate insufficient dispersion of the DEHPA, and is related to the surface area per gram of agglomerates, which is inversely proportional to the average particle diameter.

EXAMPLE 2—Copper Extraction

Acid solutions of copper, such as minewaters, which are currently being processed for recovery of copper in many locations, are readily extracted with agglomerates in accordance with the present invention. The extraction of copper by agglomerates may be done with a solid extractant agglomerated by an inert binding liquid, by a liquid extractant acting as the binder for an inert solid or by a combination of extracting solid and extracting binder, as discussed earlier. Some of the systems investigated are shown below in Table I.

TABLE I

AGGLOMERATE SYSTEMS TESTED FOR COPPER EXTRACTION
(Active Component is Underlined in Each Case)

| Solid | Binder | Remarks |
|---|---|---|
| <u>Stearic acid</u> | Chloroform | Limited by competition with $H^+$. |
| Copper oleate | <u>Oleic Acid</u> | Solid made in situ; can add system as sodium oleate, make both solid and binder in situ. $H^+$ strongly competes with $Cu^{++}$. |
| $Cu(OH)_2$ | Carbon tetrachloride | Poor agglomeration - solid is water wetted. |
| <u>8-quinolinol</u> | Oleic acid | Poor agglomeration; Cu salt is too soluble. |
| p-terphenyl | <u>LIX64N/LOPS</u> | Best system found for $Cu^{++}$. |

A. Copper Extraction with Stearic Acid/Liquid Hydrocarbon Agglomerates

The aqueous chemistry of copper extraction, whether it is done by agglomerates or other means, must deal with acidity (pH usually less than about 3), competition from ferric iron in concentrations often as high as that of copper ion itself and the presence of solids in the feedstream. Extraction of copper and stripping by acid are really opposite directions of the same reaction:

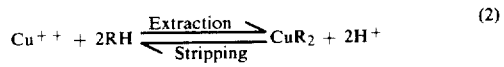

$$Cu^{++} + 2RH \underset{\text{Stripping}}{\overset{\text{Extraction}}{\rightleftarrows}} CuR_2 + 2H^+ \qquad (2)$$

From Equation (2) it is evident that the equilibrium constant will depend on the relative affinities of the R group for cupric ions and protons. Use of a carboxylic acid, such as stearic or oleic acid, for copper extraction can be done best if base is added to raise the pH and shift Equation (2) to the right. In fact, alkali consumption is the major economic factor in the use of oil solutions of such "soaps" for metal ion extraction. Use of solid agglomerated stearic acid as a copper extractant demonstrated a similar dependence on added base. A large molar excess of stearic acid was used to form the agglomerates. The procedure was as follows: (1) shake 10 g of solid and stated binding liquid ($CHCl_3$, $CCl_4$, toluene, heptane) with 75 ml of NaOH solution of various concentrations for two minutes to make the agglomerates; (2) pour off the liquid phase, weigh it and measure the pH; (3) add 60 g of 0.0157 M $CuSO_4$ (1000 ppm Cu) and shake two minutes at 4/second, eight inch displacement; (4) screen to separate the agglomerates from liquid and determine copper in the liquid. In some of the tests, the agglomerates were dried and sieved to obtain the size distribution. The results are shown below in Table II.

TABLE II

$Cu^{++}$ EXTRACTION BY AGGLOMERATES

| Run | Concentration of NaOH, N[a] | Added Base millimoles[b] | Binding Liquid | Extracted Cu millimoles | % Extracted |
|---|---|---|---|---|---|
| 1 | 0 | 0 | $CCl_4$ | 0.095 | 10.1 |
| 2 | 0.0047 | 0.0705 | $CCl_4$ | 0.118 | 12.5 |
| 3 | 0.0094 | 0.1504 | $CCl_4$ | 0.179 | 19.0 |
| 4 | 0.0235 | 0.517 | $CCl_4$ | 0.403 | 42.7 |
| 5 | 0.0469 | 1.126 | $CCl_4$ | 0.640 | 67.8 |

Notes:
[a]In solution used to form agglomerates.
[b]Assuming quantitative conversion to dissolved stearate.

For copper extraction, particularly in the case of iron-containing feeds at lower pH values (about 1 to 4), some particulate solids are commonly found in the feed, which, as previously explained, are not expected to be a severe problem when agglomerates are used as contrasted with either solvent extraction or ion-exchange.

B. Copper Extraction with p-terphenyl/Liquid Ion Exchange Agglomerates

Copper extraction was also done with the specific copper extractant LIX64N (a tradename of General Mills Corp.), which is effective in acid media and demonstrates good selectivity for copper over the ferric ion which is ordinarily present in the feedstream of interest. As purchased from General Mills, LIX64N is in 50 wt.% solution in a heavy kerosene diluent such as LOPS or S100N (vacuum distillate available from Exxon Corp.). For use in a conventional liquid-liquid extraction scheme, the reagent is diluted even more so that the volume of the organic phase throughput is comparable to that of the aqueous feed (normally the flow ratio, aqueous/organic, is 2/1 overall and 0.67 interstage with organic recycle). The reason for this is that less energy is required for nearly equal phase volumes to generate the interface required for rapid mass transfer. It is also known that larger organic phase volumes improve settling and phase separation properties. Agglomerates offer advantages over liquid extraction in that less mixing energy is required, and settling and coalesence problems are greatly reduced.

A study of stripping of agglomerates made and loaded with copper in the size range of 0.20 to 0.25 mm diameter was done by shaking for two minutes at 25° C. in 2M $H_2SO_4$ using agglomerates comprised of LIX64N (binding liquid) and p-terphenyl (solid). Analysis of the depleted copper solution used to load the agglomerates indicated a loading of 78.0±10.0% over nine independent samples by colorimetry. Table III below shows that stripping of these agglomerates is about as efficient as loading.

TABLE III

AGGLOMERATE STRIPPING 25° C.

| Test | Agglomerated Copper Charged | Copper Stripped | |
|---|---|---|---|
| 1 | 0.0491 mmoles | 0.0448 mmoles | average stripping: 84.4 ± 4.5% |
| 2 | 0.0480 mmoles | 0.0377 mmoles | |
| 3 | 0.0405 mmoles | 0.0405 mmoles | |

The critical size of agglomerates leading to greater than 98% equilibrium in two minutes shaking at 25° C. was determined to be 0.28 mm. This compares with liquid-liquid extraction, which also equilibriates in about two minutes, but the phase separation is prohibitively slow and inefficient, while the agglomerates are readily separated from the aqueous phase.

The copper system conveniently demonstrates a general advantage of agglomerated liquid extraction over the ordinary liquid-liquid mixing procedures. For a high ratio, a considerable saving in mixing intensity may be realized at high extraction efficiency. The data in Table IV below were taken to compare prior art liquid extraction at an aqueous/organic weight ratio of 9.1/1 with extraction by agglomerates (one-half part by weight of LIX64N, one-half part LOPS, and 10 parts of solid p-terphenyl, about 0.28 mm diameter) at the same weight ratio. Mixing was identical in the two extraction tests. The charge was turned for two minutes at 10 to 12 rpm. The results listed in Table IV are the average of four independent determinations in each case.

TABLE IV

COPPER EXTRACTION AT 25° C.

| | Liquid Extraction | Agglomerates |
|---|---|---|
| Copper, ppm: | | |
| Initial | 1000 | 1000 |
| Final | 899 | 709 |
| % Loading of LIX | 21.6 ± 9 | 61.8 ± 1 |

Because high efficiency of the LIX reagent is achieved in copper extraction, the volume of agglomerates needed to extract copper can be much less than the operable limiting volume of oil phase for the same liquid extraction, as mentioned earlier. This conclusion was verified as a result of the LIX agglomerate system studies; good agglomerate/aqueous separation was observed in this test.

It is evident that under conditions of minimal mixing, the agglomerates extracted nearly three times as much copper as the prior art liquid system for the same treat rate. This suggests that a feedstream might be simply poured through a bed of agglomerates to achieve an extraction. However, for feed solutions which contain an appreciable solids content, either a contactor employing a continuous countercurrent device or prefiltration step to avoid plugging of the fixed bed by solids would be used.

Extraction of copper from a synthetic minewater feed which was allowed to age for two days to generate suspended solids was done to check the possibility of interference by the solids (accumulation in the agglomerates, removal of LIX from the added agglomerates by competitive agglomeration, etc.). Control tests with LOPS added in place of the solid p-terphenyl showed no significant difference in two minutes of extraction at 25° C. from that achieved by agglomerates in the size range of 0.25 mm diameter, as shown below in Table V.

TABLE V

COPPER EXTRACTION FROM SOLIDS-CONTAINING FEED

| Test | A | B | C | D |
|---|---|---|---|---|
| Wt. 50% LIX/LOPS, g | 0.1005 | 0.1026 | 0.1062 | 0.1087 |
| Wt. p-terphenyl, g | 1.0 | — | 1.0 | — |
| Wt. LOPS, g | — | 1.0 | — | 1.0 |
| Initial Cu, ppm | 250 | 250 | 250 | 250 |
| Final Cu, ppm | 76 | 98 | 91 | 81 |
| LIX Efficiency, % | 73.8 | 63.2 | 63.8 | 66.3 |

EXAMPLE 3—Mercury Extraction

Cleanup of mercury from dilute (100 ppm) solutions by agglomerates was done. Mercury was removed to below X-ray fluorescence detection limit of 15 ppm by agglomerates of 20 parts by weight solid stearic acid to one of liquid oleic acid in four separate tests at pH 2, 3, 4 and 5 respectively. The agglomerates were made in the mercury solutions by shaking for four minutes at 25° C. The treat rate was quite low in these tests, which removed mercury from 100 ml of feed solution by 1.05 g of agglomerate.

EXAMPLE 4—Extraction of Zinc and Chromium Ions from Aqueous Solution

Di-(2 ethyl) hexyl phosphoric acid (DEHPA) is an efficient organic-soluble extraction agent for zinc in aqueous solution. It does not normally extract hexavalent chormium, which may be present as dichromate ($Cr_2O_7^{--}$) ion.

Aliquat 3365 (Tradename of General Mills) is an organic-soluble agent useful in extracting anionic species such as dichromate from water. It is composed primarily of tri-(n-octyl) N-methylammonium chloride.

In a control test, when DEHPA and Aliquat 3365 were put into the same organic phase in equal parts by weight, no extraction of either zinc or chromium was observed after 5 min. This is thought to be the result of interaction between the two extractants, probably to produce an oil-soluble salt comprising the alkylammonium cation and the anion of DEHPA.

However, when the two extractants were formed separately into agglomerates with solid p-terphenyl, and both were shaken simultaneously with the aqueous feed solution, significant extraction of both metals occurred within 5 min. This result indicates that each extractant can operate, in the agglomerated form, independently of the other. Because both may be stripped by aqueous acid, the extension to independent activity during stripping is obvious; after which the agglomerate mixture should be ready to contact fresh feed solution. Table VI below shows the comparative extraction results.

TABLE VI
EXTRACTION OF Cr AND Zn IONS FROM WATER

| Test | A | B |
|---|---|---|
| Extracting Medium | Agglomerates | 2% DEHPA, 2% Aliquat in kerosene (Control test) |
| Feed Solution/Extracting medium, wt./wt. | 50/1 | 7.73/1 |
| Feed Solution/DEHPA (= Feed/Aliquat), wt./wt. | 1000 | 388 |
| ppm Chromium in aqueous, initial | 19.6 | 19.3 |
| ppm Chromium in aqueous, after 5 min. | 16.0 | 19.4 |
| ppm Zinc in aqueous, initial | 4.12 | 3.75 |
| ppm Zinc in aqueous, after 5 min. | 1.2 | 3.75 |

Table VI shows that a low treat rate of agglomerates containing about a third as much DEHPA and Aliquat as in the liquid extraction case was effective to extract chromium and zinc. No optimization of the agglomerate size was done, which may account for the extraction of less than the total chromium present in the feed by agglomerates.

The result is reminiscent of the use of mixed ion exchange resins to simultaneously remove anionic and cationic species.

What is claimed is:

1. A process for extracting at least one dissolved metal value from a liquid phase which comprises:
    (a) contacting said liquid phase with solid-liquid agglomerates, comprising a finely divided solid, of average particle size of up to about 100 microns, dispersed in a binding liquid for the solid, said binding liquid and said solid being substantially insoluble in said liquid phase, wherein either solid, liquid or both, being capable of chemically interacting with said at least one metal value, thereby removing same from said liquid phase and wherein said agglomerates are substantially larger in average particle size than said finely divided solid, for a time sufficient to load said agglomerates with said at least one metal value;
    (b) separating said loaded agglomerates from said liquid phase;
    (c) stripping said at least one metal value from said loaded agglomerates.

2. The process of claim 1 wherein said liquid phase is an aqueous phase.

3. The process of claim 1 wherein said metal value is chromium ion, zinc ion, uranyl ion, copper ion, mercury ion, their complexes or mixtures thereof.

4. The process of claim 1 wherein said finely divided solid is a $C_6$–$C_{18}$ paraffinic acid, a high molecular weight solid organic polymer, or $C_{10}$ and higher aromatic hydrocarbon.

5. The process of claim 4 wherein finely divided solid is oleic acid, stearic acid, palmitic acid, polystyrene, or p-terphenyl.

6. The process of claim 1 wherein said binding liquid is a liquid paraffinic hydrocarbon, a liquid halogenated paraffinic hydrocarbon, alkylphosphoric acid, a trialkylphosphine oxide, or tetralkylammonium halide.

7. The process of claim 6 wherein said binding liquid is kerosene, carbon tetrachloride, chloroform, di-(2-ethyl hexyl) phosporic acid, tri-n-octylphosphine oxide or tri(n-octyl)-N-methylammonium chloride.

8. The process of claim 1 wherein said finely divided solid is partially soluble in said binding liquid.

9. The process of claim 1 wherein said finely divided solid is of average particle size of about 5–50 microns.

10. The process of claim 9 wherein said finely divided solid is of average particle size of about 5–10 microns.

11. The process of claim 1 wherein said agglomerates are of average particle size of about 100 to 500 microns.

12. The process of claim 1 wherein the weight ratio of solid:binding liquid is about 3:1 and higher.

13. The process of claim 1 wherein stripped agglomerates are recycled to contact said liquid phase.

14. The process for extracting dissolved uranyl ion from aqueous solution comprising:
    (a) contacting said aqueous solution with solid-liquid agglomerates, formed from polystyrene or p-terphenyl, of about 5 to 10 microns average particle size, and a binding liquid comprised of di-(2-ethylhexyl) phosphoric acid/tri n-octyl phosphine oxide, said agglomerates being of about 200–300 microns in average particle size, for a time sufficient to load said agglomerates with uranyl ion;
    (b) separating said loaded agglomerates from said aqueous phase;

(c) stripping said uranyl value from said loaded agglomerates.

15. A process for extracting dissolved copper value from aqueous solution comprising:
 (a) contacting said aqueous solutions with solid-liquid agglomerates, formed from polystyrene or p-terphenyl, of about 5 to 10 microns average particle size, and a binding liquid comprised of (4-hydroxy-3-aldoxime-4'-methyl) diphenylmethane, said agglomerates being about 200-300 microns in average particle size, for a time sufficient to load said agglomerates with copper ion;
 (b) separating said loaded agglomerates from said aqueous phase;
 (c) stripping said copper value from said loaded agglomerates.

16. A process for extracting dissolved mercury value from aqueous solution comprising:
 (a) contacting said aqueous solution with solid-liquid agglomerates, formed from solid stearic acid of about 5 to 10 microns average particle size, and a binding liquid comprised of oleic acid, in a 20:1 weight ratio, respectively, said agglomerates being about 200-300 microns in average particle size, for a time sufficient to load said agglomerates with dissolved mercury value;
 (b) separating said loaded agglomerates from said aqueous phase;
 (c) stripping said mercury value from said loaded agglomerates.

17. A process for extracting dissolved zinc value from aqueous solution comprising:
 (a) contacting said aqueous solution with solid-liquid agglomerates, formed from solid p-terphenyl, of 5-10 micron average particle size, and di-(2-ethyl hexyl) phosphoric acid as the binding liquid, said agglomerates being about 200-300 microns in average particle size, for a time sufficient to load said agglomerates with dissolved zinc value;
 (b) separating said loaded agglomerates from said aqueous phase;
 (c) stripping said zinc values from said loaded agglomerates.

18. A process for extracting dissolved chromium value from aqueous solution comprising:
 (a) contacting said aqueous solution with solid-liquid agglomerates, formed from solid p-terphenyl, of 5-10 micron average particle size, and tri(n-octyl) N-methylammonium chloride as the binding liquid, said agglomerates being about 200-300 microns in average particle size, for a time sufficient to load said agglomerates with dissolved chromium value;
 (b) separating said loaded agglomerates from said aqueous phase;
 (c) stripping said chromium value from said loaded agglomerates.

* * * * *